(12) United States Patent
Liberale et al.

(10) Patent No.: US 12,033,767 B2
(45) Date of Patent: Jul. 9, 2024

(54) RECONFIGURABLE COUNTERPROPAGATING HOLOGRAPHIC OPTICAL TWEEZERS WITH LOW-NA LENS

(71) Applicant: KING ABDULLAH UNIVERSITY OF SCIENCE AND TECHNOLOGY, Thuwal (SA)

(72) Inventors: Carlo Liberale, Thuwal (SA); Andrea Bertoncini, Thuwal (SA); Gheorghe Cojoc, Leonberg (DE)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 394 days.

(21) Appl. No.: 17/599,169

(22) PCT Filed: Mar. 5, 2020

(86) PCT No.: PCT/IB2020/051919
§ 371 (c)(1),
(2) Date: Sep. 28, 2021

(87) PCT Pub. No.: WO2020/212769
PCT Pub. Date: Oct. 22, 2020

(65) Prior Publication Data
US 2022/0157483 A1    May 19, 2022

Related U.S. Application Data

(60) Provisional application No. 62/915,762, filed on Oct. 16, 2019, provisional application No. 62/841,599, (Continued)

(51) Int. Cl.
*G21K 1/00* (2006.01)
*G02B 21/32* (2006.01)
(Continued)

(52) U.S. Cl.
CPC ............ *G21K 1/006* (2013.01); *G02B 21/32* (2013.01); *G02B 21/361* (2013.01); *G02B 26/0833* (2013.01)

(58) Field of Classification Search
CPC ...... G21K 1/006; G02B 21/361; G02B 21/32; G02B 26/0833
See application file for complete search history.

(56) References Cited

U.S. PATENT DOCUMENTS

2002/0185592 A1  12/2002  Grier et al.
2007/0114371 A1   5/2007  Fukuchi et al.
2010/0019136 A1*  1/2010  Merenda ................. G21K 1/006
                                                        250/251

FOREIGN PATENT DOCUMENTS

CN    108919500 A  * 11/2018 .......... G02B 17/0804
CN    108919500 A    11/2018
(Continued)

OTHER PUBLICATIONS

Thalhammer et al, "Optical Macro-Tweezers: Trapping of Highly Motile Micro-Organisms", Journal of Optics vol. 13 No. 4 (2011) pp. 44024 1-6 (Year: 2011).*

(Continued)

*Primary Examiner* — David E Smith
(74) *Attorney, Agent, or Firm* — PATENT PORTFOLIO BUILDERS PLLC

(57) ABSTRACT

A holographic optical tweezers for manipulating a micro- or nano-size particle, the optical tweezers including a light source configured to emit first and second light beams; a light focusing apparatus configured to focus the first and second light beams to generate focused light beams, which create optical forces; and a trapping assembly configured to receive the first and second focused light beams and form a trap for holding the particle with the optical forces. The (Continued)

trapping assembly includes first and second micromirrors attached to a microscope coverslip.

20 Claims, 10 Drawing Sheets

Related U.S. Application Data filed on May 1, 2019, provisional application No. 62/835,755, filed on Apr. 18, 2019.

(51) Int. Cl.
*G02B 21/36* (2006.01)
*G02B 26/08* (2006.01)

(56) References Cited

FOREIGN PATENT DOCUMENTS

| EP | 2439748 A1 * | 4/2012 | ............ G02B 21/32 |
|---|---|---|---|
| EP | 2439748 A1 | 4/2012 | |
| WO | 2008012767 A2 | 1/2008 | |
| WO | 2013097869 A1 | 7/2013 | |

OTHER PUBLICATIONS

Brzobohaty et al, "Micro-Particles Self-Arrangement in Shapeable Counter-Propagating Beams", Proc. of SPIE vol. 9164 91642L-1 p. 1-6 (Year: 2014).*
Thalhammer et al, "Optical Macro-Tweezers: Trapping of Highly Motile Micro-Organisms", Journal of Optics vol. 13 No. 4 (2011) pp. 4402 1-6 (Year: 2011).*
Brzobohaty et al, "Micro-Particles Self-Arrangement in Shapeable Counter-Propagating Beams", Proc. of SPIE vol. 9164 91642L-1 p. 16, 2014 (Year: 2014).*
Beicker, K., et al., "Vertical Light Sheet Enhanced Side-View Imaging for AFM Cell Mechanics Studies," Scientific Reports, Jan. 24, 2018, vol. 8, pp. 1-12 (w/Supplementary Information).
Bowman, R., et al., "Position Clamping in a Holographic Counterpropagating Optical Trap," Optics Express, May 5, 2011, vol. 19, No. 10, pp. 1-7.
Brzobohaty, O., et al., "Micro-Particles Self-Arrangement in Shapeable Counter-Propagating Beams," Proceedings of SPIE / IS & T, Sep. 16, 2014, vol. 9164, pp. 91642L-1-91642L-6.
Donato, M.G., et al., "Optical Trapping, Optical Binding, and Rotational Dynamics of Silicon Nanowires in Counter- Propagating Beams," Nano Letters, Dec. 7, 2018, vol. 19, pp. 342-352, American Chemical Society.
Galland, R., et al., "3D High- and Super-Resolution Imaging Using Single-Objective SPIM," Nature Methods, May 11, 2015, vol. 12, No. 7, pp. 641-650, Nature America, Inc.
Gebhardt, J.C.M., et al., "Single-Molecule Imaging of Transcription Factor Binding to DNA in Live Mammalian Cells," Nature Methods, Mar. 24, 2013, vol. 10, No. 5, 421-429, Nature America, Inc.

Greiss, F., et al., "Single-Molecule Imaging in Living Drosophila Embryos with Reflected Light-Sheet Microscopy," Biophysical Journal, Feb. 2016, vol. 110, pp. 939-946, Biophysical Society.
Grier, D.G., "A Revolution in Optical Manipulation," Nature, Aug. 14, 2003, vol. 424, pp. 810-816, Nature Publishing Group.
International Search Report in corresponding/related International Application No. PCT/IB2020/051919, date of mailing May 29, 2020.
Karpinski, P., et al., "Counter-Propagating Optical Trapping of Resonant Nanoparticles Using a Uniaxial Crystal," aser & Photonics Reviews, Jul. 19, 2018, vol. 12, pp. 1800139 1-5, WILEY-VCH Verlag Gmbh & Co. KGaA.
Kashekodi, A.B., et al., "Miniature Scanning Light-Sheet Illumination Implemented in a Conventional Microscope," Biomedical Optics Express, Aug. 14, 2018, vol. 9, No. 9, pp. 4263-4274.
Liberale, C., et al., "Integrated Microfluidic Device for Single-Cell Trapping and Spectroscopy," Scientific Reports, Feb. 13, 2013, vol. 3, pp. 1-6.
Loh, P.Y., et al., soSPIM Developed at MBI Microfabrication Leads to a New Microscopy Method, MBI Mechanobiology Institute, MBI Science Communications Facility, May 11, 2015, 1 pp.
Marki, A., et al., "Microfluidics-Based Side View Flow Chamber Reveals Tether-to-Sling Transition in Rolling Neutrophils," Scientific Reports, Jun. 30, 2016, vol. 6, 28870, pp. 1-8.
Meddens, M.B.M., et al., "Single Objective Light-Sheet Microscopy for High-Speed Whole-Cell 3D Super-Resolution," Biomedical Optics Express, May 17, 2016, vol. 7, No. 6, 258956, pp. 1-18.
Mehtani, D., et al., "Nano-Raman Spectroscopy with Side-Illumination Optics," Journal of Raman Spectroscopy, Sep. 19, 2005, vol. 36, pp. 1068-1075, John Wiley & Sons, Ltd.
Perch-Nielsen, I.R., et al., "Real-Time Interactive 3D Manipulation of Particles Viewed in Two Orthogonal Observations Planes," Apr. 18, 2005, vol. 13, No. 8, pp. 2852-2857, Optical Society of America.
Shin, S., et al., "Enhancement of Optical Resolution in Three-Dimensional Refractive-Index Tomograms of Biological Samples by Employing Micromirror-Embedded Coverslips," Lab on a Chip, Oct. 4, 2018, vol. 18, No. 22, pp. 3484-3491, The Royal Society of Chemistry.
Thalhammer, G., et al., "Optical Macro-Tweezers: Trapping of Highly Motile Micro-Organisms," Journal of Optics, Mar. 14, 2011, vol. 13, No. 4, p. 44024 1-6, IOP Publishing Ltd.
Written Opinion of the International Searching Authority in corresponding/related International Application No. PCT/IB2020/051919, date of mailing May 29, 2020.
Zhang, S., et al., "Impact of Complex Surfaces on Biomicrorheological Measurements Using Optical Tweezers," Lab on a Chip, Dec. 5, 2017, vol. 18, No. 2, pp. 315-322, The Royal Society of Chemistry.
Ashkin, A., "Acceleration and Trapping of Particles by Radiation Pressure," Physical Review Letters, Jan. 26, 1970, vol. 24, No. 4, pp. 156-159.
Guck, J., et al., "The Optical Stretcher: A Novel Laser Tool to Micromanipulate Cells," Biophysical Journal, Aug. 2001, vol. 81, pp. 767-784, Biophysical Society.

* cited by examiner

RECONFIGURABLE COUNTERPROPAGATING HOLOGRAPHIC OPTICAL TWEEZERS WITH LOW-NA LENS

CROSS-REFERENCE TO RELATED APPLICATIONS

This application is a U.S. National Stage Application of International Application No. PCT/IB2020/051919, which claims priority to U.S. Provisional Patent Application No. 62/835,755, filed on Apr. 18, 2019, entitled "OPTICAL TRAPPING AND MANIPULATION WITH A LOW NA OBJECTIVE THROUGH 3D PRINTED MICRO-MIRRORS," U.S. Provisional Patent Application No. 62/841,599, filed on May 1, 2019, entitled "RECONFIGURABLE COUNTERPROPAGATING HOLOGRAPHIC OPTICAL TWEEZERS THROUGH SINGLE LOW-NA OBJECTIVE ENABLED BY 3D PRINTED MICRO-MIRRORS," and U.S. Provisional Patent Application No. 62/915,762, filed on Oct. 16, 2019, entitled "RECONFIGURABLE COUNTER-PROPAGATING HOLOGRAPHIC OPTICAL TWEEZERS WITH LOW-NA LENS," the disclosures of which are incorporated herein by reference in their entirety.

BACKGROUND

Technical Field

Embodiments of the subject matter disclosed herein generally relate to a system and method for achieving reconfigurable multiple optical traps, and more particularly, to a system that uses counterpropagating light beams for trapping and manipulating microscopic objects.

Discussion of the Background

Optical Tweezers (OT) exploit optical forces to trap, manipulate and characterize microscopic particles. Cells and microorganism are in such a small dimensional range that they are suitable for optical tweezing. Therefore, optical tweezers have a lot of potential in biological studies.

In optical tweezing of microscopic particles two different forces come to play: (1) the gradient force and (2) the scattering force. The gradient force (1), which is proportional to the intensity gradient of the electrical field of the light, attracts the particle towards regions with high intensity, usually the beam waist of a converged laser beam, for example, a focal point generated by a microscope objective. The higher the numerical aperture (NA) of the objective of the microscope, the stronger will be the force due to the strong gradient. The scattering force (2) pushes the particle along the direction of the light propagation. To obtain a stable 3D trapping for a given particle, these forces and other forces (gravity, buoyancy, fluid-dynamic etc.) acting on the particle need to be fully balanced.

The most common optical tweezing system relies on one high-numerical aperture (NA) microscope objective that creates a tight focus, in which the particle is trapped due to the gradient force, which in this case balances the scattering force which would push the particle forward. The trap can be multiplexed by using a dynamic diffractive optical element such as a Spatial Light Modulator (SLM), which can create multiple foci after the objective, and therefore, multiple traps that can also be dynamically moved in the 3D space, allowing for the manipulation of one or more particles. When a dynamic diffractive optical element is included, the optical tweezing system is called "holographic optical tweezers." If the particle to be trapped is a cell, the use of near-infrared lasers is preferred due to low absorption and heating effects on biological samples at near-infrared wavelengths.

A different way to configure an optical trap is by using two beams which come from opposing directions and intersect at a given point, where the trap is formed. This configuration corresponds to a counterpropagating optical tweezers. In this case, the scattering forces generated by each beam balance each other, leaving only the gradient force in the center of the trap. The main advantage of this approach is that it does not require high-NA optics, it can even be achieved with diverging beams such as the output of an optical fiber. Moreover, because this approach does not require the use of bulky high-NA optics, the working distance can be quite long, allowing the trapping of bigger particles. However, a problem with this approach is that it requires careful alignment of the two opposing beams as now discussed.

For example, FIG. 1 schematically shows a system 100 that has two counterpropagating beams 110 and 120 that enter microscope objectives 112 and 114, respectively, and the beams intersect along an axis X in a given medium 130 for trapping a particle 140. A microscope objective 150 is placed between the two objectives 112 and 114 for observing from a side the trapped particle 140. This configuration has been disclosed in [1]. A variation of this configuration uses only one microscope objective and a mirror for achieving the two counterpropagating beams, as discussed in [2]. In this configuration, to allow the compatibility with the transmission illumination microscopy, the mirror is designed to reflect only the specific wavelength of the laser, therefore the trapping wavelength is fixed. This approach also includes a micro-prism to allow an orthogonal side view of the trapped object. Still another configuration uses two optical fibers for generating the counterpropagating beams, as discussed in [3]. In this approach, the two beams are fixed in space, so the 3D movement of the trap cannot be achieved. Mainly a 1D (axial) movement can be achieved by un-balancing the power output of the two fibers.

As these approaches have limitations due to the lack of capability of moving the trap in 3D, there is a need for a system and method for trapping small particles (microscopic particles, in the range of nano- and/or micrometers) and for freely being able to move the trapped particles in 3D.

BRIEF SUMMARY OF THE INVENTION

According to an embodiment, there is a holographic optical tweezers for manipulating a micro- or nano-size particle. The optical tweezers includes a light source configured to emit first and second light beams, a light focusing apparatus configured to focus the first and second light beams to generate focused light beams, which create optical forces, and a trapping assembly configured to receive the first and second focused light beams and form a trap for holding the particle with the optical forces. The trapping assembly includes first and second micromirrors attached to a microscope coverslip.

According to another embodiment, there is a holographic optical tweezers for manipulating a micro- or nano-size particle. The optical tweezers includes a laser device configured to emit a laser beam, a spatial light modulator configured to generate first and second light beams from the laser beam, a microscope objective configured to focus the first and second light beams to generate focused light beams, which create a gradient force, a microscope coverslip, and first and second micromirrors configured to receive the first and second focused light beams and direct the first and second focused light beams along counterpropagating directions to form a trap for holding the particle with the gradient force. The first and second micromirrors are attached to the microscope coverslip.

According to still another embodiment, there is a method for manipulating a micro- or nano-sized particle with a holographic optical tweezers. The method includes generating a laser beam with a laser device, splitting the laser beam with a spatial light modulator into first and second light beams, focusing with a microscope objective the first and second light beams, to generate focused light beams, which create a gradient force, and adjusting, with first and second micromirrors and the spatial light modulator, directions of the first and second focused light beams to make the first and second focused light beams to move along counterpropagating directions to form a trap for holding the particle with the gradient force.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to an optical tweezers system that uses two counterpropagating optical beams for forming a trap. However, the embodiments to be discussed next are not limited to using only one pair of counterpropagating beams, but may be used with plural pairs of counterpropagating beams for forming plural traps at the same time.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, an optical tweezers system is configured to achieve reconfigurable, multiple, optical traps based on counterpropagating beams that allow the trapping and manipulation of objects (particles, cells, etc.) with a wide range of microscopic dimensions (e.g., 1 to 200 µm). In this optical tweezers system, counterpropagating optical beams are obtained from a laser source by splitting the laser beam in one or more pairs of light beams, which can create many traps in the 3D space. These pairs of light beams are then redirected to face each other by 3D micromirrors. The micromirrors may be fabricated with 3D printing of polymer prisms coated with a metal reflecting layer (e.g., gold) on a transparent standard 170-micron thick microscopy glass coverslip (also known as a microscope slide) and also on a standard microscope slide that is 1 mm thick. In this way, the formed micromirrors are integrated onto a platform that is compatible with many microscopy systems, including the ones with transmission illumination. The trapping laser wavelengths can be varied because the gold mirror is broadband.

In addition to the generation of multiple light beams, the holographic optical tweezers allow for the 3D movement of the optical traps, and therefore, the manipulations of the particles in any direction in the 3D space. In one particular case, this configuration is highly favorable for the rotation of particles, by rotating the center of symmetry of the traps, or by using beams with Orbital Angular Momentum (OAM) which can be generated with the SLM device.

Figure 1:
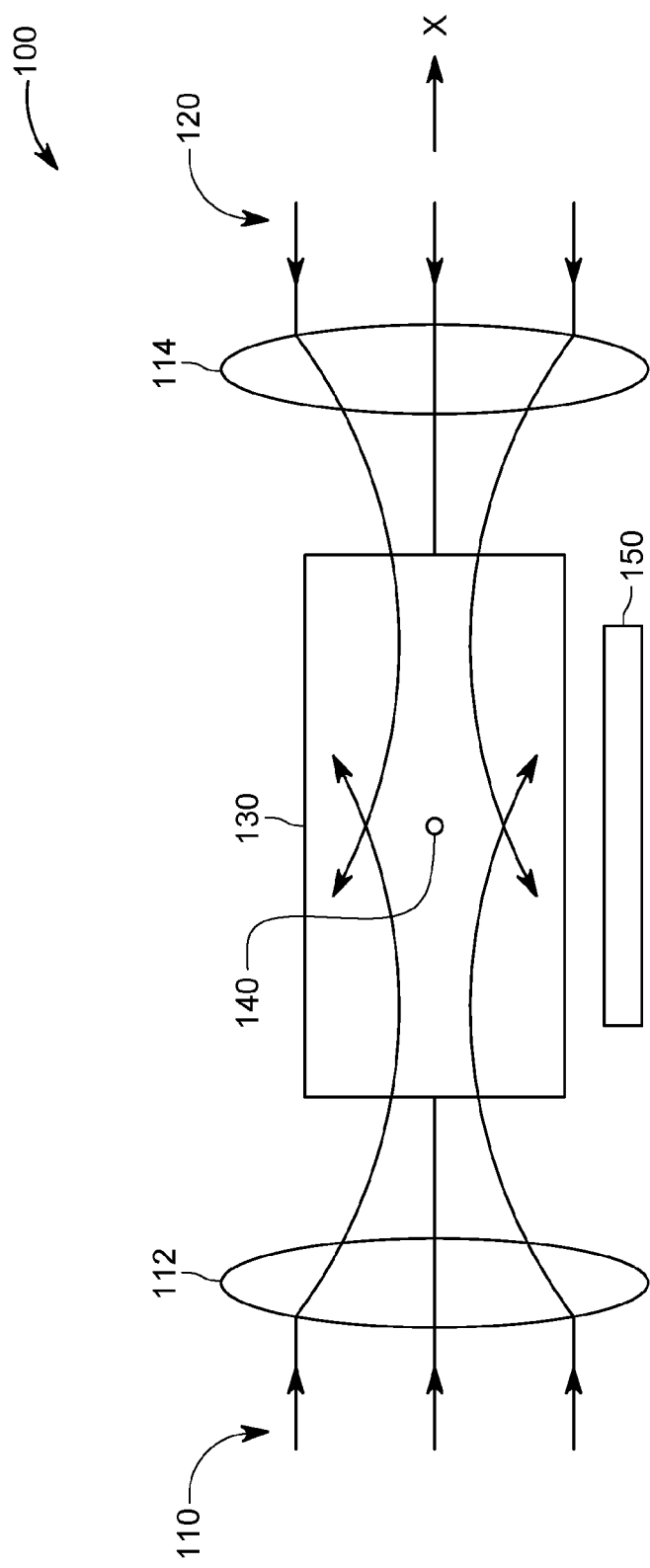
FIG. 1 is a schematic diagram of an optical tweezers that used counterpropagating light beams for trapping a particle.
Figure 2:
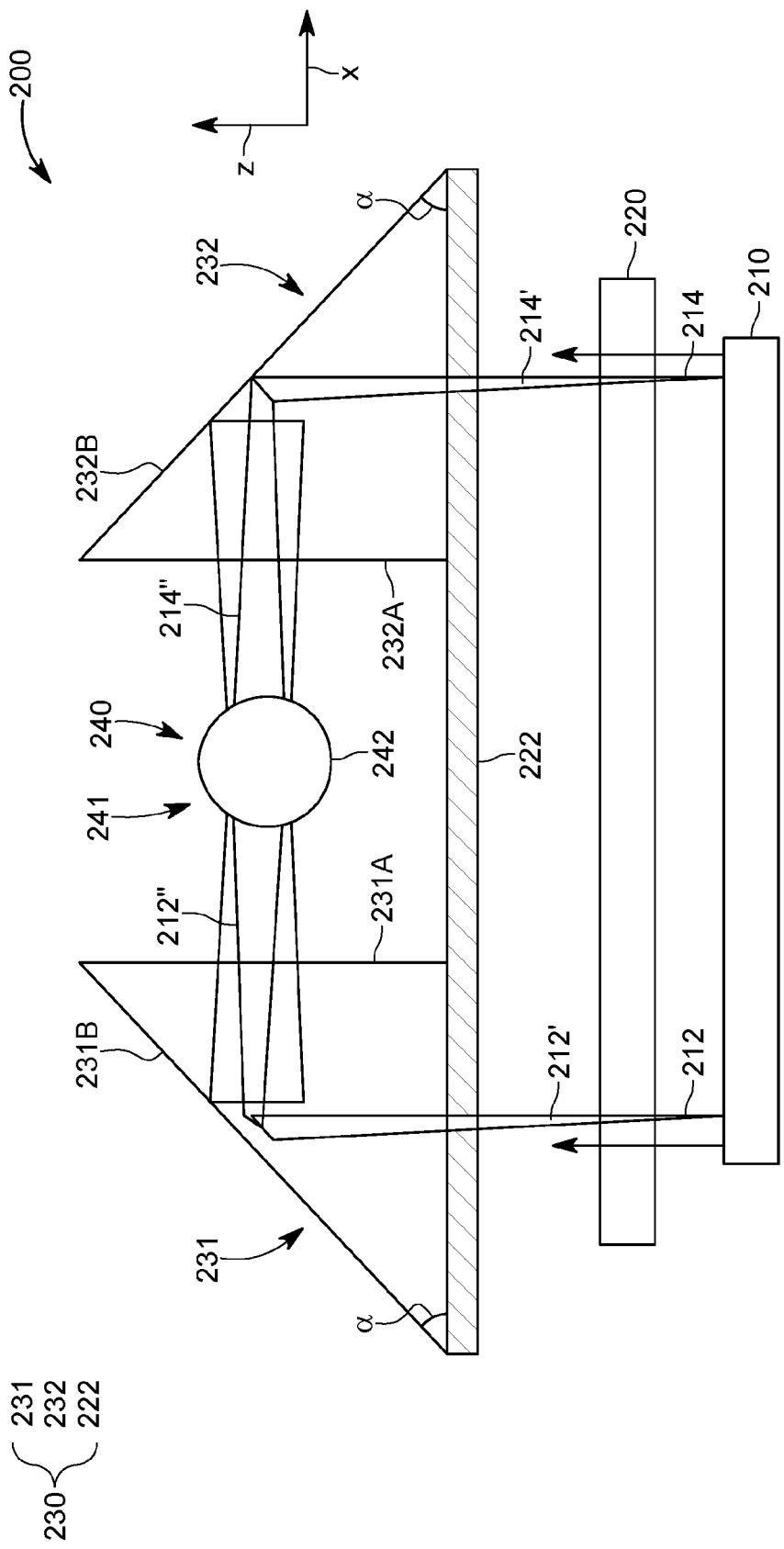
FIG. 2 is a schematic diagram of a novel holographic optical tweezers that used counterpropagating light beams and two micromirrors for trapping a particle.

More specifically, as shown in FIG. 2, an optical tweezers system 200 includes a light source 210 (to be discussed in more detail later) that is configured to generate at least two light beams 212 and 214. The light beams are directed by an optical path adjusting device 220 (to be discussed in more detail later) to a trapping assembly 230. The optical path adjusting device 220, which may include the light focusing device 332 of FIG. 3, transforms the two light beams 212 and 214 into focused light beams 212' and 214'. The trapping assembly 230 includes a glass coverslip 222 (which is understood herein to also include a standard microscope slide), which may be configured to fit in any traditional microscope. The trapping assembly further includes two opposing micromirrors 231 and 232, which are provided on the glass coverslip 222 and are configured for changing the light propagation of the light beams by about 90 degrees (those skilled in the art will understand that smaller or larger angles may also be used), from the Z axis to the X axis, as shown in the figure. Note that the two micromirrors have sizes less than 2 mm, and they are shaped as prisms. Note also that the two opposing micromirrors 231 and 232 are placed or attached or directly grown on the glass coverslip 222 so that their walls 231A and 232A that define a space 240 are substantially perpendicular (note that the walls can make smaller angles with the glass coverslip) to the glass coverslip 222. Inclined walls 231B and 232B of the two micromirrors, which form an angle α (different from zero or 90) with the glass coverslip 222, are placed to face outside the space 240. The two deviated light beams 212" and 214" are configured to intersect in the space 240, defined by the two walls 231A and 232A of the micromirrors 231 and 232, so that a trap 241 is formed in the space 240 and at least one particle 242 is trapped in this trap.

Figure 3:
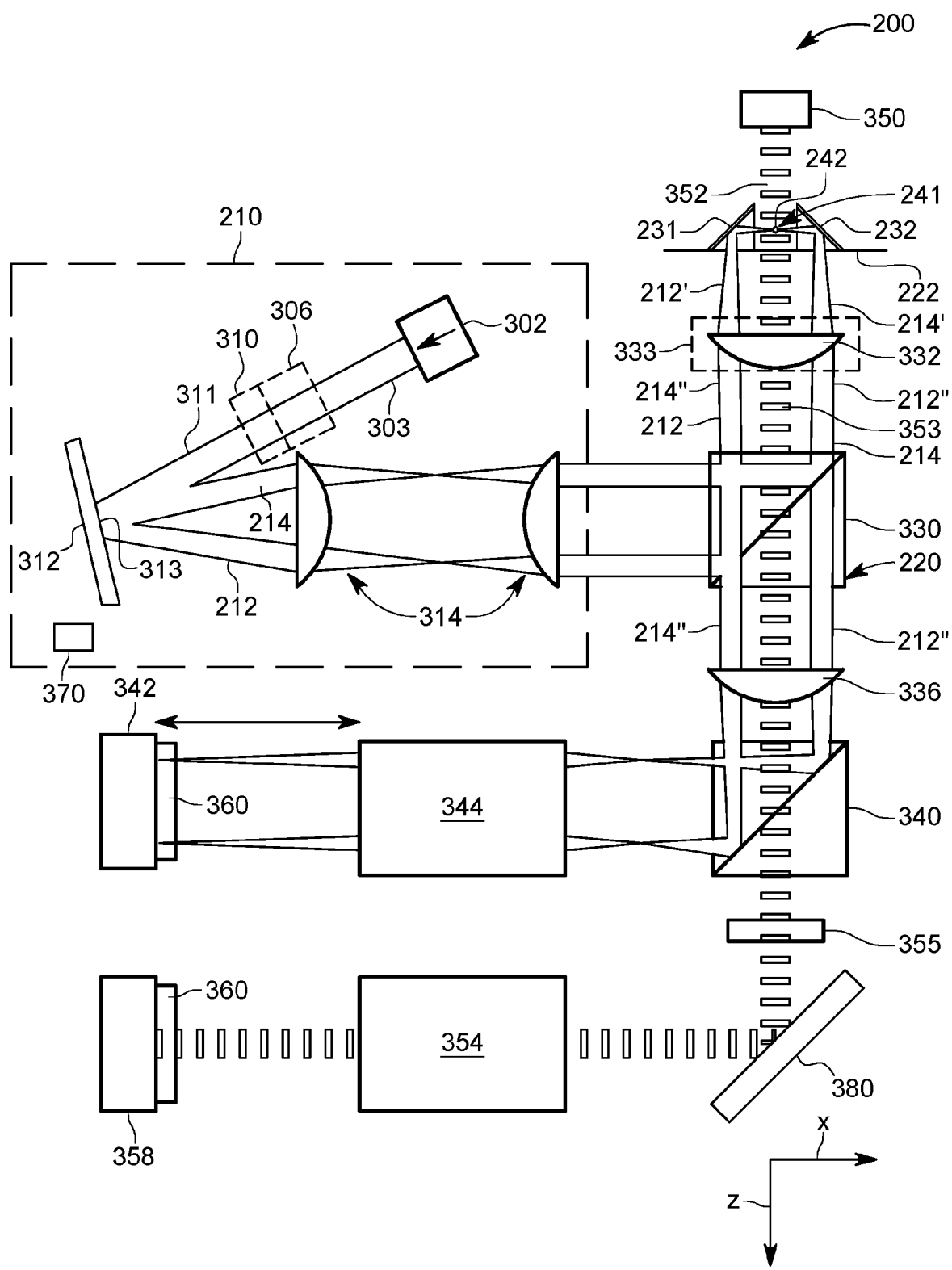
FIGS. 3 and 4 illustrate various components of the novel holographic optical tweezers that use counterpropagating light beams and two micromirrors for trapping a particle.

The optical tweezers system 200 is shown in FIG. 3 in a specific implementation, in which the light source 210 includes a high-power laser 302 (for example, a laser that emits a laser beam 303 having a 1030 nm wavelength, but other wavelengths are possible), and optionally, an optical fiber for guiding the laser beam 303 to a polarization controller and a polarizer plate, all of which are illustrated by box 306. The polarization of the laser beam can be controlled with these two elements. The polarized light may then be sent to a telescope 310 (e.g., a two-lenses system) to expand the light beam. The collimated and expanded light beam 311 is next reflected from the SLM device 312.

The SLM device 312 is a device that can spatially modulate light in either amplitude, phase or polarization and can be based on liquid crystals displays. For the embodiment discussed with regard to FIG. 3, the SLM device 312 is selected to modulate the phase of the output light. The advantage of such device is that one can dynamically shape the outcoming laser beam by changing the optical phase mask displayed onto the SLM. A more general term for this kind of device is reconfigurable Diffractive Optical Element (DOE). In one application, the SLM device is driven as a grayscale display in which different levels of gray correspond to different phase delays. By applying different phase masks, many different operations (steering, focusing, splitting, etc.,) can be applied to the incoming light beam. Other devices that can do reconfigurable optical traps are galvanometric mirrors, AcoustoOptic Deflectors (AOD) and Digital Mirror Device (DMD), which are faster than the SLM device, but with less degrees of freedom in terms of the shaping of the light beam. Note that by controlling the phase of the incoming collimated light beam 311, plural light beam may be reflected off the SLM device.

In this embodiment, for simplicity, only a pair of collimated laser beams 212 and 214 are shown as being reflected from the SLM device (although in practice many laser beams are reflected from the SLM device), with a small angle (for example, equal to or less than 10 degrees), which adds the wanted spatial optical phase modulation to them. A controller 370, which is discussed later, can be connected to the SLM device 312 for controlling this angle for each reflected light beam. The output beams 212 and 214 are relayed with a 4f system 314 (e.g., 2 lenses forming a telescope) to the optical path adjusting device 220 (e.g., a beam splitter). More specifically, the two light beams 212 and 214 are directed, with a dichroic mirror 330 (which may be part of the optical path adjusting device 220), to the back focal plane of a low-NA light focusing device 332, which may be part of a microscope 333. In one application, the light focusing device 332 may be a high-NA objective. In one application, the light focusing device 332 is a microscope objective, for example, a 20× 0.4 NA, which is mounted on a commercial inverted microscope 333. In another application, the light focusing device 332 includes just a lens or a plurality of lenses. Thus, reference number 332 may indicate herein a full microscope objective, a single lens, or a plurality of lenses. The microscope objective is preferred because it is configured to be free of light aberrations. Therefore, for simplicity, in the following, the holographic optical tweezers 200 is considered to have a microscope objective 332. However, the invention is not limited to a microscope objective, but it may use just a single lens or a plurality of lenses. With this configuration, it is possible to focalize the incoming beams at multiple points, simultaneously, on the sample plane or in different planes. This capability is used to create multiple trapping points.

The SLM device 312 is used to split the input light beam 311 into at least two output light beams 212 and 214, for its simplest configuration. As previously discussed, the SLM device 312 may be used to generate up to 10 or 20 pairs of light beams. After the light beams 212 and 214 are redirected by the dichroic mirror 330, which may be shaped as a prism, they are passed through the objective 332, to form the focused light beams 212' and 214'. The focused light beams 212' and 214' are then received by the two micromirrors 231 and 232 and they are reflected and directed into the trapping space 240 to form the trap 241.

The two micromirrors 231 and 232 may be shaped as prims (those skilled in the art will understand that these elements may be shaped differently as long as they have a reflecting surface (metallic or other coating) placed at a proper tilt angle) and they are facing each other as discussed with regard to FIG. 2. After reflection from the prisms and proper alignment (described later), the focused beams 212' and 214' become counterpropagating beams 212' and 214' (see FIG. 2) and form the optical trap 241. Such a counter propagating optical trap is known as a Dual Beam Laser Trap (DBLT). The entire volume 240 between the two micromirrors 231 and 232 (the distance between them can vary from a few micrometers up to several mm) is available for trapping. In this way, a trapping volume of 1 $mm^3$ can be achieved by having the micromirrors 231 and 232 sized to have a height of 1 mm and the two micromirrors are spaced apart by a distance of 1 mm.

In one embodiment, the incoming laser beam 311 (typically in the visible or near-infrared wavelength range) is expanded with the optical telescope 310 to overfill a screen 313 of the SLM device 312. After the reflection from the SLM device, the 4f system 314 decreases the size of the light beams 212 and 214 to match the size of the back aperture of the microscope objective 332. The beams 212 and 214 are then directed through the dichroic mirror 330, which sends the pair of beams 212 and 214 to the microscope objective 332, but also allows for the beams 212" and 214" reflected from the micromirrors to move toward the imaging part 342/358 of the setup discussed in the following.

The reflected beams 212" and 214" correspond to the focused beam lights 212' and 214' after passing the trap 241 and the object 242 trapped by the trap. These reflected beams 212" and 214" move through the microscope objective 332 towards the dichroic mirror 330, then pass through a tube lens 336, which is needed for image formation in conjugation with the microscope objective 332, and are reflected at a second dichroic mirror 340, to be directed to a first camera 342. A telescope 344 may be used to relay the image formed by the tube lens 336 to the first camera 342. These reflected light beams 212" and 214" propagate along the Z axis, opposite to the incoming light beams 212 and 214. In addition to these reflected light beams, an additional light beam 353 is passing the objective 332, the first dichroic mirror 330 and the second dichroic mirror 340, along the axis Z, opposite to the incoming light beams 212 and 214. This additional light beam 353 is originally generated as light beam 352 by a light source 350, which may be the light source of the microscope 333. This is called the transmission mode as the light beam 352 is transmitted from one side of the coverslip 222 to the other.

Figure 4:
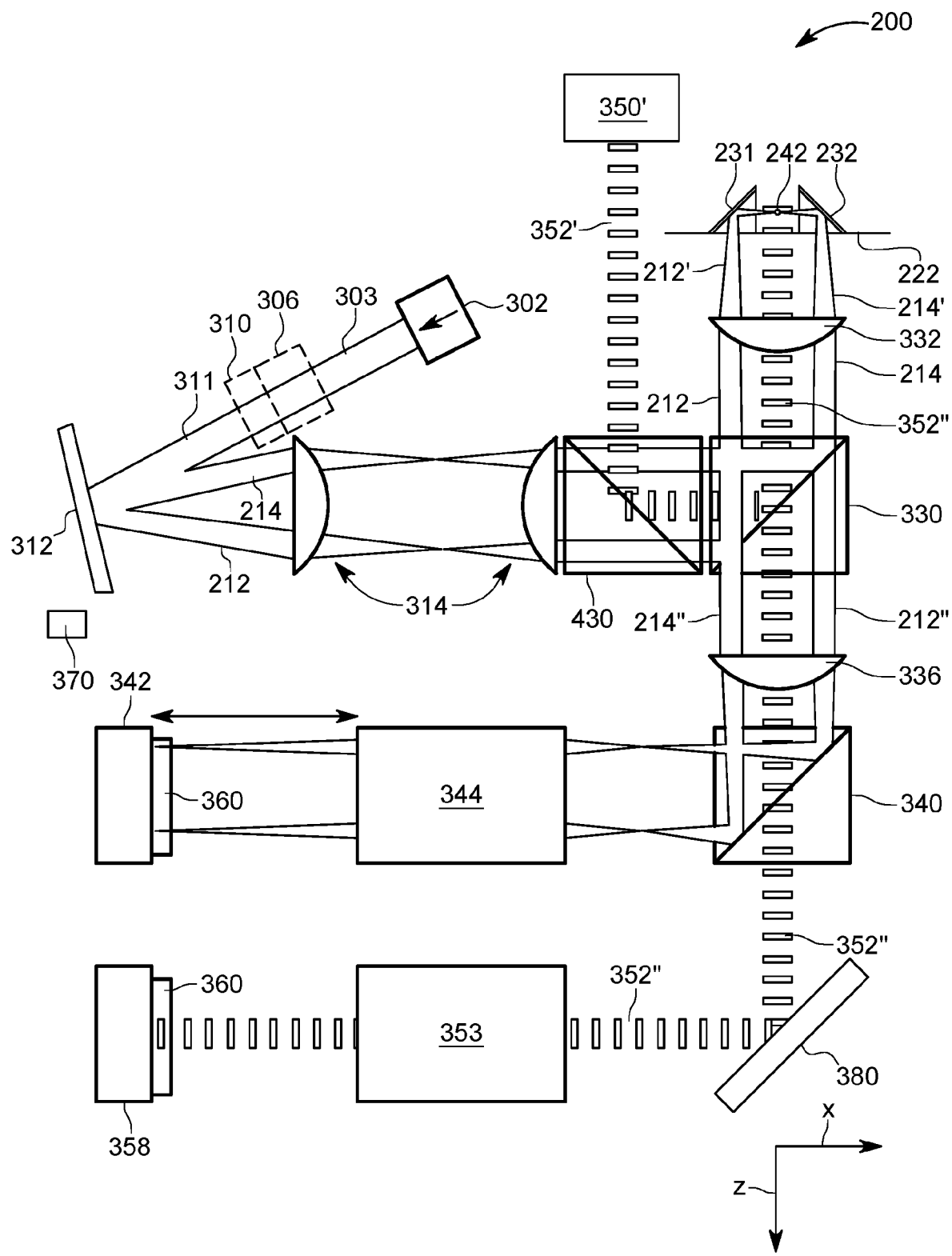

However, it is possible as illustrated in FIG. 4, to use a reflection mode in which a reflection illumination lamp 350' is used instead of the illumination lamp 350. The light beam 352' generated by the reflection illumination lamp is directed with a beam splitter 430 along the direction Z, toward the trap 240. After the light beam 352' illuminates the particle 242, the reflected light 352" is passing the microscope objective 332 and the beam splitters 330 and 340, to arrive at a mirror 380, which directs the light to the second camera 358.

Returning to FIG. 3, the generated light beam 352 illuminates the particle 242, after which it passes the glass coverslip 222 and the objective 332 to become the light beam 353. This light beam 353 may be filtered with a dichroic filter 355 and then relayed with a telescope 354 before being recorded by a second camera 358. Note that the imaging path for the second camera 358 is not passing through the two micromirrors 231 and 232 and shares the same optical axis Z as the objective 332, while the imaging path for the first camera 342 is passing through the two micromirrors 231 and 232, therefore has its optical axis X perpendicular to the optical axis Z.

The first and second cameras 342 and 358 receive light from the same objective 332. In other words, the configuration shown in FIGS. 3 and 4 uses a single lens/objective 332 while the existing optical tweezers use a first microscope objective for trapping the beams and a second microscope objective for imaging the trapped particle, from a side view. For this traditional configuration to work, the second microscope objective is positioned on a different optical path from the first microscope objective, e.g., orthogonal to the common optical axis of the trapping beams.

By contrast, the embodiments of FIGS. 3 and 4 allow a direct side view of the trapped particle 242, by the same microscope objective 332 which is used to create the optical traps 241 (which is the imaging path of the optical microscope). In other words, the present configuration can simultaneously: a) trap the particle 242 at trap 241, b) image directly the particle 242 from below, and c) also image the particle 242 from a side, by using a unique lens/objective 332.

To be able to simultaneously collect in-focus images of the trapped particle 242, as seen from the bottom and from the side, the configuration of FIG. 3 or the configuration of FIG. 4 uses, in addition to the first and second cameras 342 and 358, two mechanical translators 360. Each camera is conjugated to a slightly different focal plane by either tuning the distance from its respective telescope, 344 and 354, or by shifting both the cameras and their corresponding telescope, as the direct and the reflected optical paths have different optical lengths, as noted in FIG. 5. Still with regard to FIG. 3, it is possible to have the controller 370 (for example, a processor or a computing device, which is discussed later) to coordinate and control the generation of the original light beam from the laser source 302, and also the splitting of the light beam into plural light beams at the SLM device 312. The controller 370 may also be connected to the microscope objective 332, first camera 342, and second camera 358 for automatically performing alignments, data collection and other tasks, which are discussed later.

Figure 5:
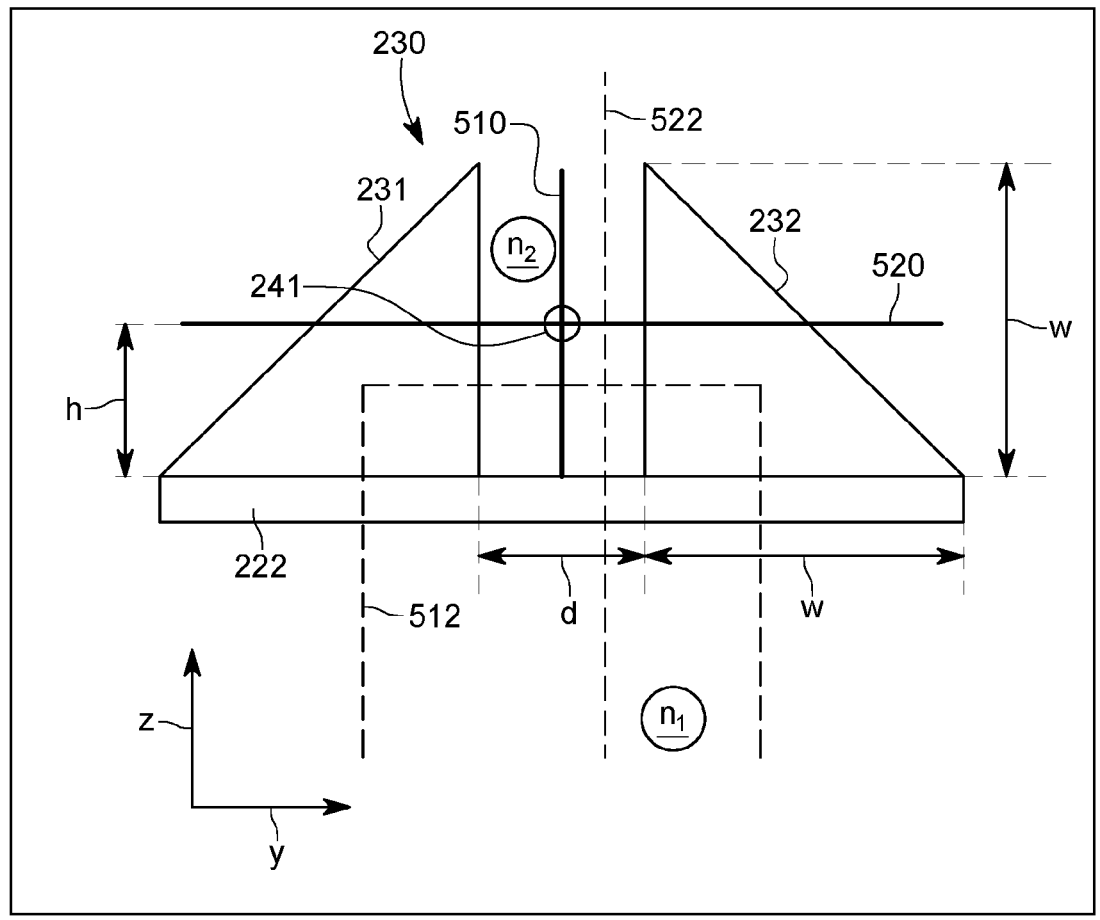
FIG. 5 schematically illustrates the light beams propagation through the micromirrors and how the light beams are aligned to form the trap.

With regard to FIG. 5, the first camera 342 (for example, a Silicon detector camera, sensitive to both visible and near-IR light) is configured to be conjugated with the focal plane 510, and has an optical path 512 which passes through the micromirrors 231 and 232, giving a side view of the trapped particle. The second camera 358 (for example, a Silicon detector camera too) is configured to be conjugated with the focal plane 520, and has an optical path 522 that passes through the microscope slide 222 and then directly to the trapping point position 241, without passing through the micromirrors 231 and 232 (giving an image of the trapped particle 242 from the bottom view), as illustrated in FIG. 5. In this way, both the first and second cameras can image the same trapped particle 242, but from different views, with a single objective/lens 332. FIG. 5 also shows a length of the base of the mirrors 231 and 232 being w, a height of the mirrors being also w, and a distance between the walls of the mirrors that define the trapping space 240 being d.

The alignment procedure to set the first and second cameras, 342 and 358, to be conjugated with the focal planes 510 and 520, respectively, is now described. The second camera 358 is positioned at the focal distance from its telescope 354, so that to be conjugated with focal plane of the objective 332. The objective 332 is moved in order to set the bottom part of the mirrors 231 and 232 (i.e., the glass slide/medium interface 222) in focus with the second camera 358. In a second step, the objective's position is moved upwards by a distance h, which corresponds to the desired height of the optical trap relative to the glass slide 222, which is multiplied by the ratio between the refractive index n1 of the medium where the objective 322 is located and the refractive index n2 of the medium where the particle 242 is trapped. In this regard, note that the objective may be placed in air while the particle may be placed in a liquid, or the other way around. In one application, both the objective and the particle are placed in the liquid. The two refractive indices are illustrated in FIG. 5. The current position of the objective 332 is considered to be the reference position. Further, an object, for example, a glass pipette used for sample handling, is placed in the space 240 between of the two mirrors 231 and 232 (i.e., plane 510 in FIG. 5). Then, a relative distance between the camera 342 and its tube-lens 344 is changed until the object (pipette in this embodiment) is in focus through the mirrors 231 and 232 (this is best done with reflection illumination). Alternatively, it is possible to have a glass coverslip formed with two micromirrors and a pole located where the plane 510 is shown in FIG. 5 and use the pole 510 for tuning the image formation in the cameras. In this way, the role of the pipette is performed by the pole. In this case, after the cameras are adjusted to be at the desired positions, the glass coverslip with the pole and the two micromirrors is replaced with the one shown in FIGS. 3 and 4 or the glass coverslip with the two micromirrors and the pole has an additional pair of micromirrors and thus, the slide is simply moved to use the additional pair of micromirrors.

Figure 6A:
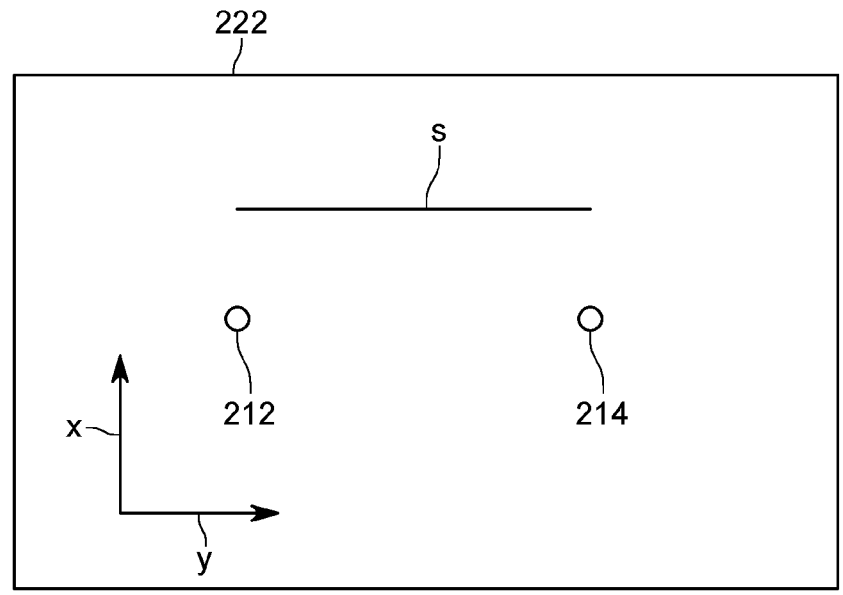
FIGS. 6A to 6D illustrate the steps taken to align the counterpropagating light beams.
Figure 6B:
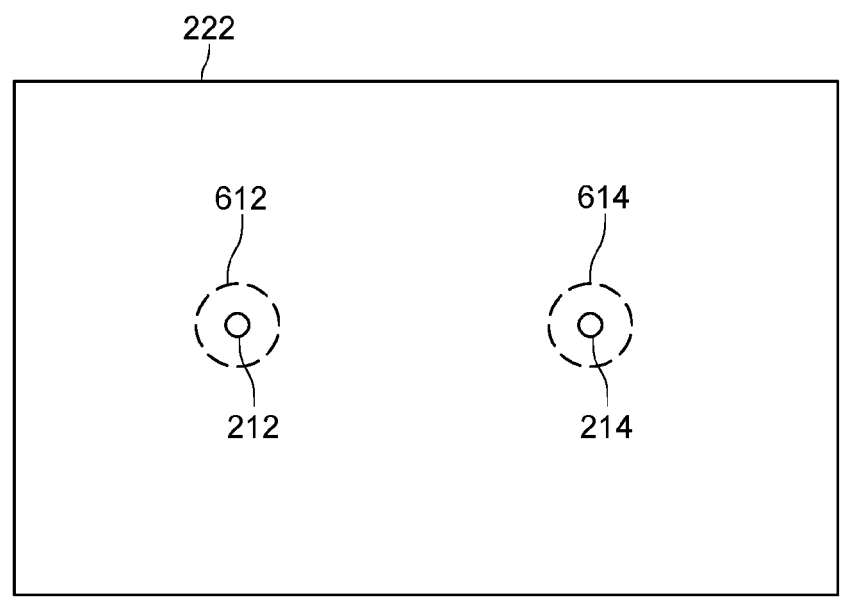

To be able to have the right light beams trapping the particle 242, the incoming light beams 212 and 214 need to be aligned with the mirrors 231 and 232. An alignment procedure of the incoming light beams 212 and 214 is now discussed with regard to FIGS. 6A to 6D. FIG. 6A shows a bottom view of the area with the two mirrors 231 and 232, as seen from the first camera 342 perspective. The glass coverslip 222 is omitted in this figure for simplicity. The method starts with step 700 (see FIG. 7), in which the two beams 212 and 214 are generated with the SLM device 312, and the glass coverslip 222 is laterally translated so that they do not pass though the mirrors 231 and 232, as illustrated in FIG. 6A. A distance between the two beams is selected in this embodiment to be equal to $s=d+2(w-h)$, (note that this formula holds only for 45 degrees micromirrors; if the micromirror angle changes, the formula need to be changed accordingly) where d is the distance between the walls of the mirrors that define the trap space 240, w is the base and height of each mirror, and h is the height of the wanted trapping position relative to the support 222 of the two mirrors 231 and 232, as illustrated in FIG. 5. In step 702, the objective 332 is moved in order to have the reflections on the coverslip 222 of the two beams, 212 and 214, in focus with the first camera 342. Extra gold pads (not shown) may be added to the glass coverslip 222 for enhancing the beam reflection. The positions of the first and second beams 212 and 214 are marked within the first camera 342 software with markers 612 and 614 (see FIG. 6B), respectively.

Figure 6C:
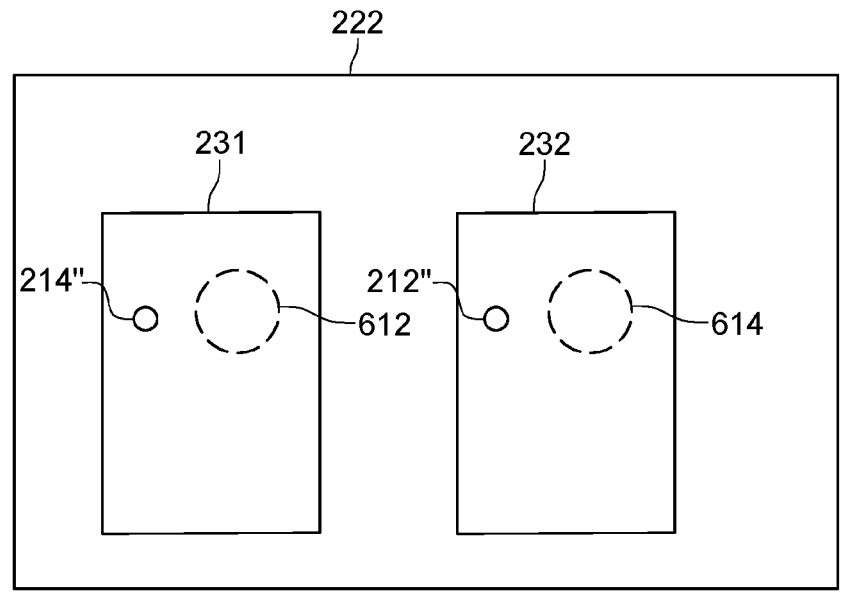
Figure 7:
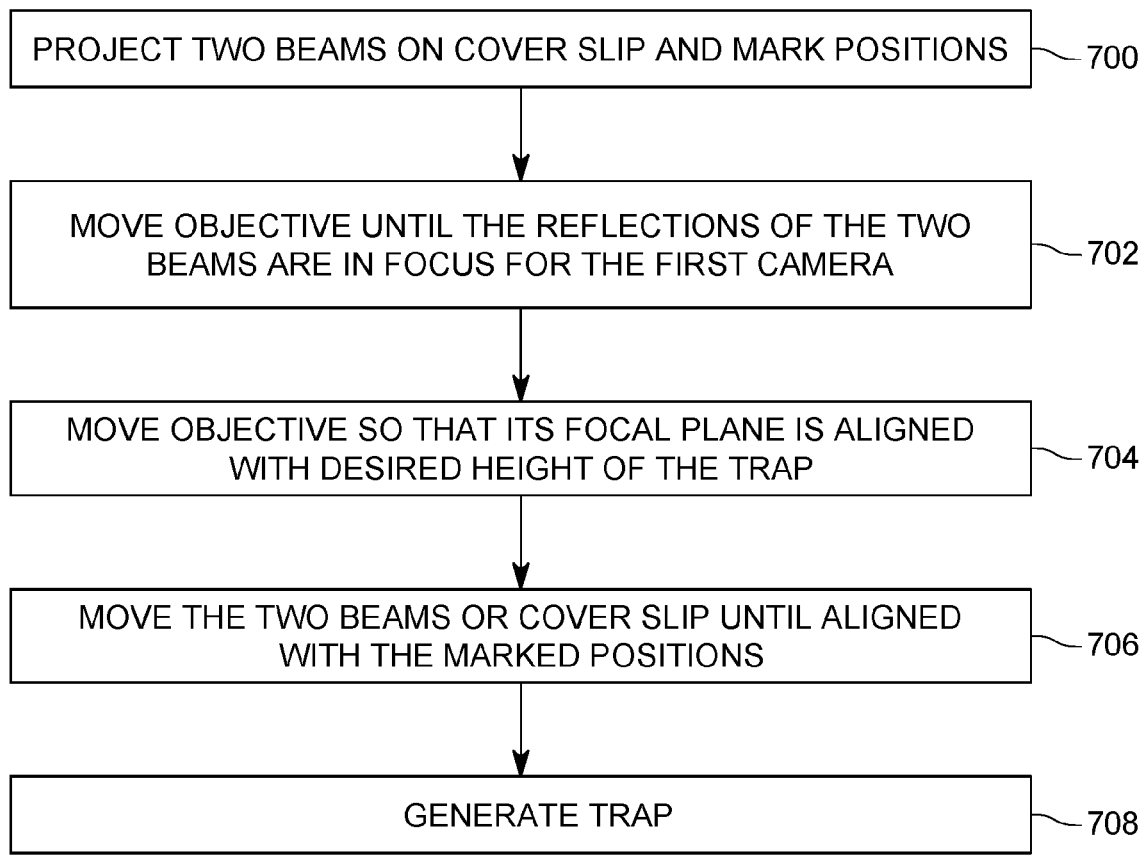
FIG. 7 is a flowchart of a method for aligning one or more pairs of counterpropagating light beams.

In step 704, the objective's position is moved to the reference position previously described, so that its focal plane now corresponds to the plane at the desired height h of the optical trap relative to the glass coverslip 222. Also, the glass coverslip 222 is laterally translated in order for the two beams 212 and 214 to pass through the mirrors 231 and 232, generating two reflected beams, 212" and 214", that are imaged on the first camera 342, as shown in FIG. 6C. At this stage, in general, the two reflected laser spots on the first camera 342 are not focused and do not overlap with the markers 612 and 614. The position of the focus of the two beams reflected by the micromirrors, 212' and 214' of FIG. 2, can be set by using a lens-like phase mask on the SLM device in order to shift axially the focal position without moving the objective 332. The two beams can be focused at plane 510, if optical trapping is to be performed with focused beams, or at other planes if trapping is to be done with non-focused (e.g., divergent) beams. The SLM device allows decoupling of the imaging plane from the plane where the beams are focusing. In one application, the two beams can be divergent at plane 510 and not focused, depending on the desired behavior of the trap.

Figure 6D:
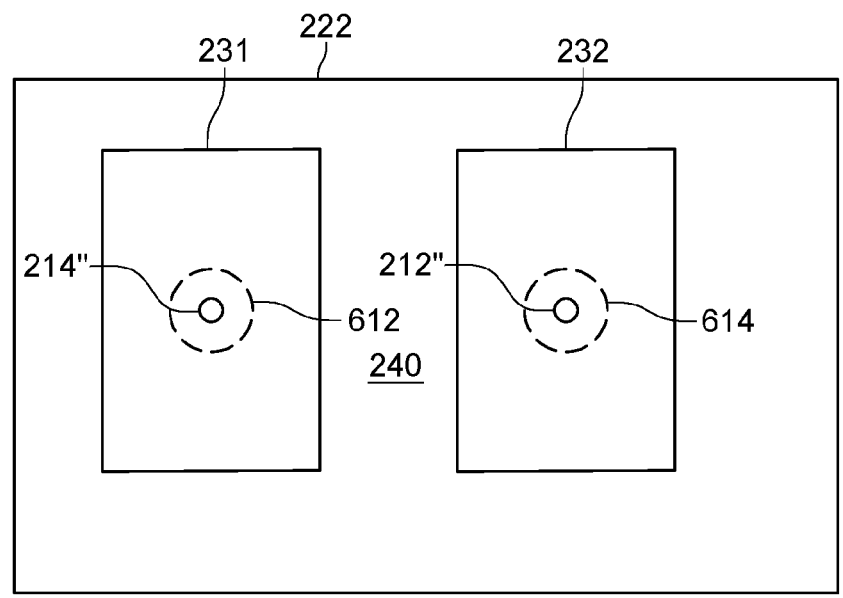

In step 706, the coverslip 222 is moved in the y direction until the beams 212" and 214" become aligned with the markers 612 and 614, as illustrated in FIG. 6D. In this way, the counter propagating beams, after being reflected on the mirrors, will be at the same height h relative to the coverslip 222, between the mirrors 231 and 232. Then, in step 708, the trap 241 is generated between the two mirrors 231 and 232 and the optical system is ready to act as an optical tweezers.

In one embodiment, the micromirrors 231 and 232 may be 3D printed using a Two-Photon Lithography (2PL) system. The polymer used, IP-S (Nanoscribe GmbH), provides smooth surfaces and fast printing of big volumes. A first step for the fabrication of the micromirrors 231 and 232 is the 3D printing of the corresponding microprisms on a 170 µm thick glass coverslip 222 or a 1 mm standard glass slide. Then, a 50 nm thick gold layer is deposited by sputter coating, which uniformly covers all the coverslip and all the faces of the prisms. At this stage, the substrate would be unusable for trapping or for transmission microscopy.

Therefore, to maintain the selective gold deposition only on the slated face of the microprisms, a protective layer of polymer is printed on top of the microprisms followed by a process of gold etching, which finally removes gold from the non-protected areas, e.g., the coverslip and the walls of the microprisms that define the trapping volume. Careful 3D alignment of the prisms and the protective layer is required for a successful mirror fabrication.

The fabrication process of the micromirrors and the coverslip are suitable for mass production by using an automatized fabrication workflow. Such a workflow may be implemented as an automatic alignment procedure based on a computer vision algorithm. The Nanoscribe 3D printer is essentially a microscope, which can scan the substrate, detect the edges of the microprisms and automatically align and print the protective layer. By using this software and by parallelizing all the steps of development, sputtering and etching, it is possible to produce these elements in a short time.

Similar microstructures could be obtained by metal evaporation, electrodeposition, or fine inkjet printing instead of metal sputtering. Similarly, the protective layer could be achieved by standard lithography or other methods, instead of 3D printing. The micromirrors 231 and 232 may be implemented in other ways such as hollow prisms, inverted prisms or, in the simplest case, as a tilted surface coated with a reflective material.

In the case in which these microprisms do not need to be immersed in water, the metal layer is not even necessary, just a 45-degree prism made of dielectric material with a refractive index close to 1.5 to obtain total internal reflection. In one application, it is possible also to work with prisms without the reflective metal coating, by exploiting the Fresnel reflection between the polymer material of the prism and the external medium. For this approach, a large part of the laser power is not used for trapping (as it is transmitted instead of reflected), but the fabrication procedure becomes very simple. In one other embodiment, the micromirrors are commercially available and they are attached, for example, glued, to the coverslip of a microscope.

Figure 8:
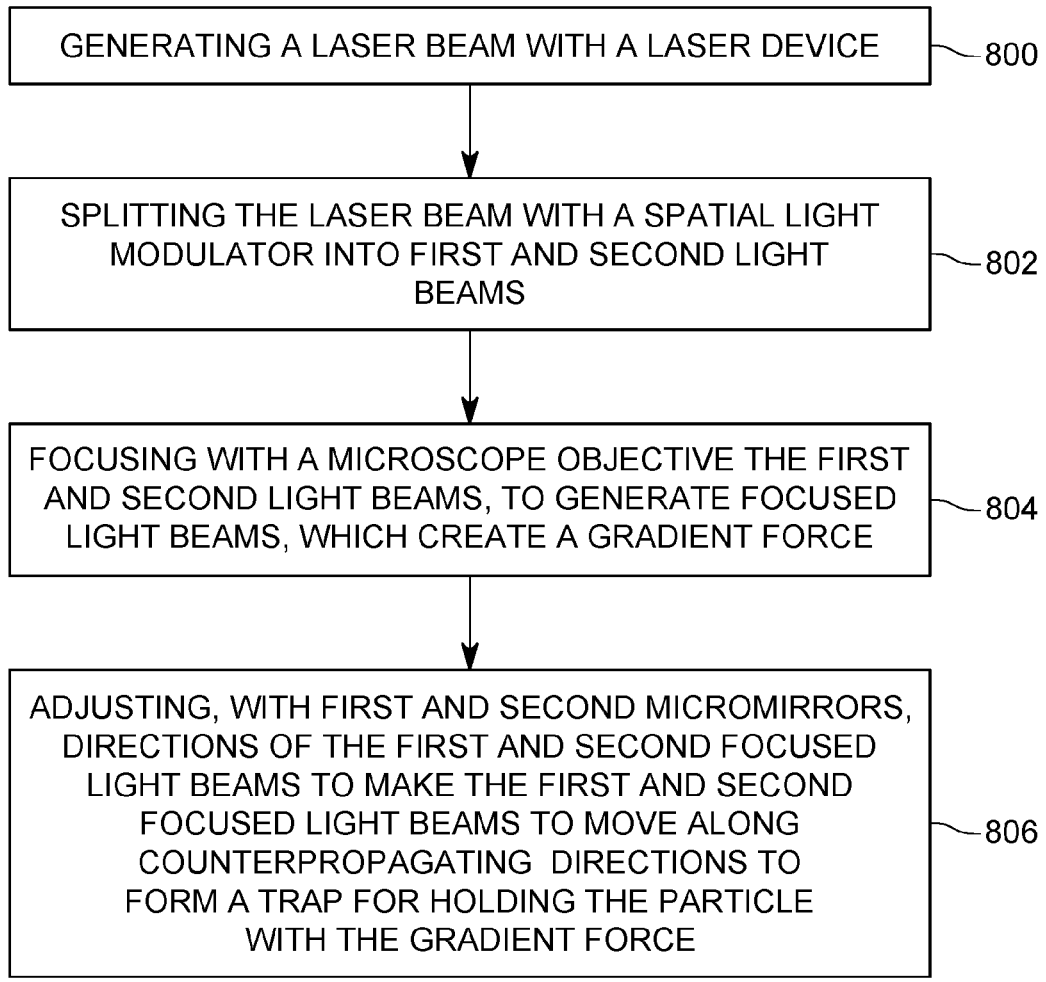
FIG. 8 is a flowchart of a method for forming a trap with counterpropagating light beams and two micro-mirrors.

A method for manipulating a particle with a holographic optical tweezers as shown in FIGS. 2 and 3 is now discussed with regard to FIG. 8. The method includes a step 800 of generating a laser beam with a laser device, a step 802 of splitting the laser beam with a spatial light modulator, into first and second light beams, a step 804 of focusing with only one microscope objective the first and second light beams, to generate focused light beams, and a step 806 of adjusting, with first and second micromirrors, directions of the first and second focused light beams to make the first and second focused light beams to move along counterpropagating directions to form a trap for holding the particle with the optical forces. Fine adjustment of the beam direction can also be achieved with the SLM.

Figure 9:
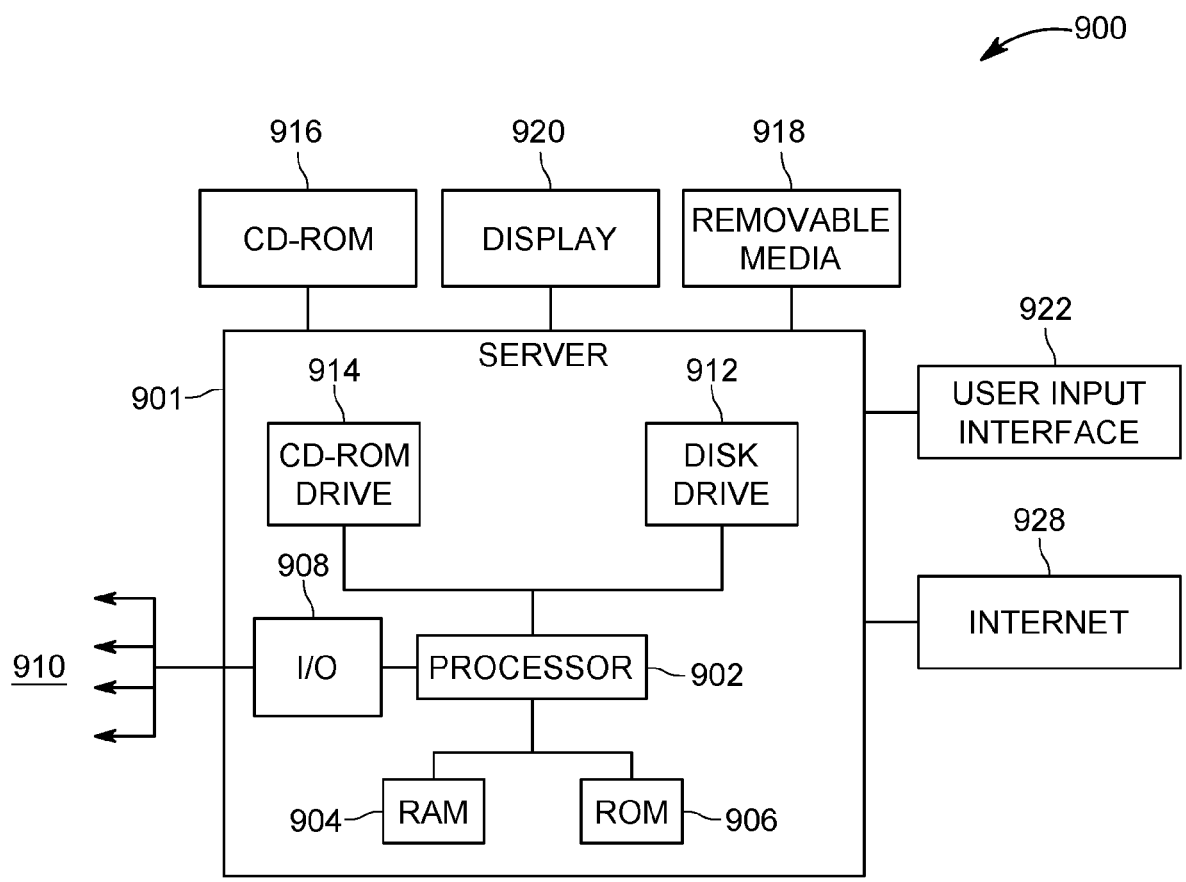
FIG. 9 is a schematic diagram of a controller that can be used with the novel optical tweezers to trap a particle and move the particle in the entire 3D space.

The above-discussed procedures and methods may be implemented in a computing device as illustrated in FIG. 9. Hardware, firmware, software or a combination thereof may be used to perform the various steps and operations described herein.

Exemplary computing device 900 suitable for performing the activities described in the above discussed embodiments may include a server 901. Such a server 901 may include a central processor (CPU) 902 coupled to a random access memory (RAM) 904 and to a read-only memory (ROM) 906. ROM 906 may also be other types of storage media to store programs, such as programmable ROM (PROM), erasable PROM (EPROM), etc. Processor 902 may communicate with other internal and external components through input/output (I/O) circuitry 908 and bussing 910 to provide control signals and the like. Processor 902 carries out a variety of functions as are known in the art, as dictated by software and/or firmware instructions.

Server 901 may also include one or more data storage devices, including hard drives 912, CD-ROM drives 914 and other hardware capable of reading and/or storing information, such as DVD, etc. In one embodiment, software for carrying out the above-discussed steps may be stored and distributed on a CD-ROM or DVD 916, a USB storage device 918 or other form of media capable of portably storing information. These storage media may be inserted into, and read by, devices such as CD-ROM drive 914, disk drive 912, etc. Server 901 may be coupled to a display 920, which may be any type of known display or presentation screen, such as LCD, plasma display, cathode ray tube (CRT), etc. A user input interface 922 is provided, including one or more user interface mechanisms such as a mouse, keyboard, microphone, touchpad, touch screen, voice-recognition system, etc.

Server 901 may be coupled to other devices, such as sources, detectors, etc. The server may be part of a larger network configuration as in a global area network (GAN) such as the Internet 928, which allows ultimate connection to various landline and/or mobile computing devices.

The disclosed embodiments provide a holographic optical tweezers system that is capable of manipulating a micro-nano-scale particle with a single microscope objective. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

[1] A. Ashkin, (1970), "Acceleration and Trapping of Particles by Radiation Pressure," Phys. Rev. Lett. 24, 156-159.
[2] Bowman, R., Jesacher, A., Thalhammer, G., Gibson, G., Ritsch-Marte, M., & Padgett, M. (2011), "Position clamping in a holographic counterpropagating optical trap," Optics Express, 19(10), 9908-9914. http://doi.org/10.1364/OE.19.009908.
[3] Guck et al., (2001), Biophys. J. 81, 767-784.

What is claimed is:

1. A holographic optical tweezers for manipulating a micro- or nano-size particle, the optical tweezers comprising:
   a light source configured to emit first and second light beams;
   a light focusing apparatus configured to focus the first and second light beams to generate focused light beams, which create optical forces; and
   a trapping assembly configured to receive first and second, reflected, focused light beams and form a trap for holding the particle with the optical forces,
   wherein the trapping assembly includes first and second micromirrors attached to a microscope coverslip, the first focused light beam is reflected from the first micromirror and the second focused light beam is reflected from the second micromirror so that the first and second, reflected, focused light beams, after being reflected by the first and second micromirrors, respectively, are counterpropagating when first encountering the particle.

2. The holographic optical tweezers of claim 1, wherein the first and second micromirrors are shaped as prisms having a base and a height smaller than 1 mm.

3. The holographic optical tweezers of claim 1, wherein the first and second micromirrors are shaped as prisms and are attached to the microscope coverslip so that facing faces of the first and second micromirrors are perpendicular to the microscope coverslip.

4. The holographic optical tweezers of claim 3, wherein a distance d between the facing faces of the first and second micromirrors is related to a distance s between places where the first and second focused beams enter the first and second micromirrors, respectively.

5. The holographic optical tweezers of claim 4, where $s=d+2(w-h)$, where w is a length of a base of each of the first and second micromirrors, and h is a height where the focused beams exit the facing faces of the first and second micromirrors to form the trap.

6. The holographic optical tweezers of claim 1, wherein the light source comprises:
   a laser device that generates a laser beam; and
   a spatial light modulator device configured to receive the laser beam and generate the first and second light beams.

7. The holographic optical tweezers of claim 6, wherein the spatial light modulator is configured to spatially modulate the laser beam in one of an amplitude, a phase or a polarization.

8. The holographic optical tweezers of claim 6, wherein the spatial light modulator modulates a phase of the first and second light beams so that a phase front of the first light beam is different from a phase front of the second light beam.

9. The holographic optical tweezers of claim 1, wherein the light focusing apparatus comprises:
   only one microscope objective, which is part of a microscope.

10. The holographic optical tweezers of claim 9, further comprising:
    a first camera configured to receive reflected light beams, which are reflected from the trapping assembly after passing the particle; and
    a second camera configured to receive an additional light beam, which illuminates the particle and generates an image of the particle,
    wherein the first and second cameras are recording different images of the particle.

11. The holographic optical tweezers of claim 10, wherein an optical axis of the microscope objective is perpendicular to the optical axes of the first and second cameras.

12. A holographic optical tweezers for manipulating a micro- or nano-size particle, the optical tweezers comprising:
    a laser device configured to emit a laser beam;
    a spatial light modulator configured to generate first and second light beams from the laser beam;
    a microscope objective configured to focus the first and second light beams to generate first and second focused light beams, which create a gradient force;
    a microscope coverslip; and
    first and second micromirrors configured to receive the first and second focused light beams and reflect the first and second focused light beams along counterpropagating directions to form a trap for holding the particle with the gradient force, and the first and second, reflected, focused light beams are counterpropagating, after being reflected from the first and second micromirrors, when first encountering the particle,
wherein the first and second micromirrors are attached to the microscope coverslip.

13. The holographic optical tweezers of claim 12, wherein the first and second micromirrors are shaped as prisms and are attached to the microscope coverslip so that facing faces of the first and second micromirrors are perpendicular to the microscope coverslip.

14. The holographic optical tweezers of claim 13, wherein a distance d between the facing faces of the first and second micromirrors is related to a distance s between places where the first and second focused beams enter the first and second micromirrors, respectively.

15. The holographic optical tweezers of claim 14, where s=d+2(w−h) when the first and second micromirrors are 45 degrees mirrors, where w is a length of a base of the first and second micromirrors, and h is a height where the focused beams exit the facing faces of the first and second micromirrors.

16. The holographic optical tweezers of claim 12, wherein the spatial light modulator modulates phase fronts of the first and second light beams so that a phase front of the first light beam is different from a phase front of the second light beam.

17. The holographic optical tweezers of claim 12, further comprising:
a microscope that includes the microscope objective and the coverslip.

18. The holographic optical tweezers of claim 12, further comprising:
a first camera configured to receive reflected light beams, which are reflected from the first and second micromirrors, after passing the particle; and
a second camera configured to receive an additional light beam, which illuminates the particle and generates an image of the particle,
wherein an optical axis of the microscope objective is perpendicular to the optical axes of the first and second cameras.

19. A method for manipulating a micro- or nano-sized particle with a holographic optical tweezers, the method comprising:
generating a laser beam with a laser device;
splitting the laser beam with a spatial light modulator into first and second light beams;
focusing with a microscope objective the first and second light beams, to generate first and second focused light beams, which create a gradient force; and
adjusting, with first and second micromirrors and the spatial light modulator, directions of the first and second focused light beams to make the first and second, reflected, focused light beams to move along counterpropagating directions to form a trap for holding the particle with the gradient force,
wherein the first, reflected, focused light beam is reflected from the first micromirror and the second, reflected, focused light beam is reflected from the second micromirror so that the first and second, reflected, focused light beams are counterpropagating when first encountering the particle.

20. The method of claim 19, further comprising:
adjusting phase fronts of the first and second light beams for moving the particle.

* * * * *